United States Patent [19]

Stoneham

[11] 3,852,784

[45] Dec. 3, 1974

[54] EARLY METERING FAILURE PREVENTION DEVICE

[75] Inventor: Jeffrey Richard Stoneham, Hilton, N.Y.

[73] Assignee: Eastman Kodak Company, Rochester, N.Y.

[22] Filed: Apr. 30, 1973

[21] Appl. No.: 355,620

[52] U.S. Cl. ............................. 354/206, 354/213
[51] Int. Cl. ........................ G03b 1/16, G03b 9/68
[58] Field of Search ........ 95/31 FM, 31 AC, 31 FL

[56] References Cited
UNITED STATES PATENTS

| | | | |
|---|---|---|---|
| 3,532,040 | 10/1970 | Ehgartner et al. | 95/31 FM |
| 3,633,477 | 1/1972 | Hackenberg et al. | 95/11 R |
| 3,682,066 | 8/1972 | Simon | 95/31 FM |
| 3,736,854 | 6/1973 | Beach | 95/31 FM |

Primary Examiner—Robert P. Greiner
Attorney, Agent, or Firm—R. F. Brothers

[57] ABSTRACT

A camera mechanism for cocking the camera shutter and metering the advancement of film is adapted to prevent metering prior to cocking of the shutter. The mechanism comprises a sensing pawl on a sensing slide which drops into a film perforation just prior to complete advancement of the film by a full frame and a metering pawl on a metering lever which moves to prevent further advancement of the film in response to movement of the sensing slide to a metering postion. Such movement of the sensing slide and consequent metering is prevented by interaction of the metering lever with the shutter high energy lever. Movement of the high energy lever to its cocked position frees the metering lever from engagement with the high energy lever and permits metering upon advancement of a film perforation into a position in which it engages the sensing pawl and moves the sensing slide to its metering position.

7 Claims, 7 Drawing Figures

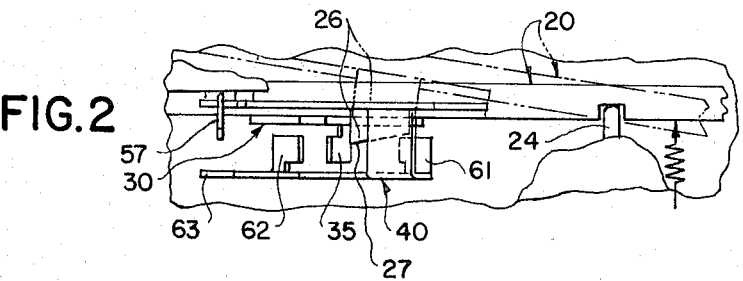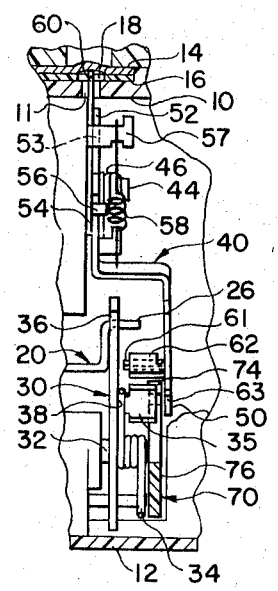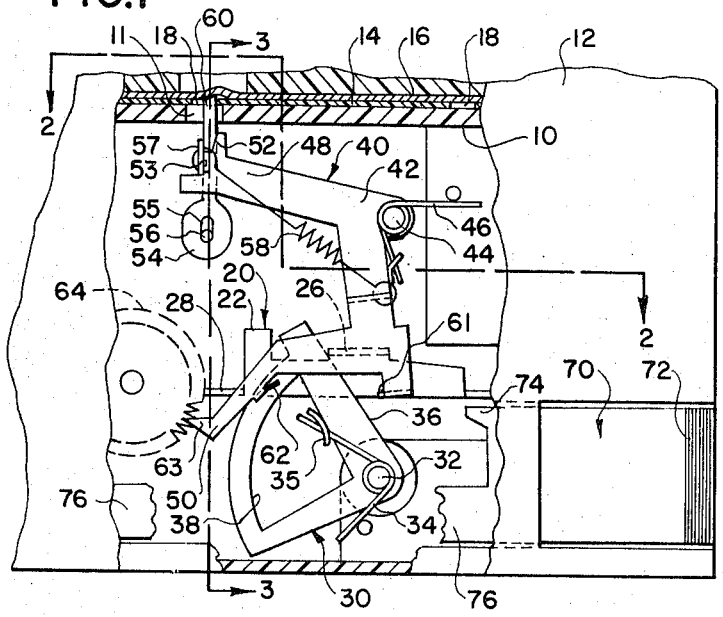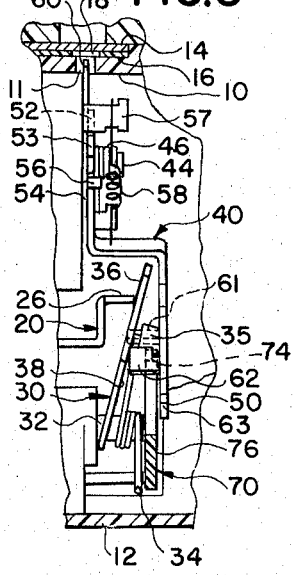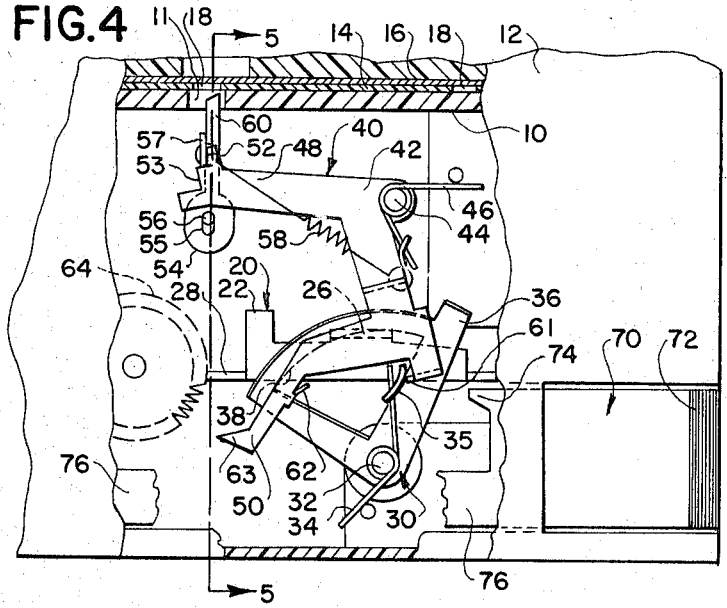

EARLY METERING FAILURE PREVENTION DEVICE

BACKGROUND OF THE INVENTION

1. Field of the Invention

The present invention relates to photographic cameras of the type adapted to be loaded with roll film having perforations for metering the advancement of successive frames into exposure position and, in particular, to such a camera having a mechanism adapted to cooperate with such a roll film to cause metering of the film.

2. Description of the Prior Art

It is well known to provide a roll film camera with means for advancing the film within the camera and a mechanism for arresting the film winding means automatically as each successive film exposure area is moved into proper exposure position in alignment with the camera lens. In roll film cartridges which are particularly appropriate for use in cameras according to the present invention, the film is provided with a metering perforation adjacent to each film exposure area. One mechanism for accomplishing metering of such a film is disclosed in U.S. Pat. No. 3,148,605. When a cartridge is loaded into a camera such as that disclosed in U.S. Pat. No. 3,148,605, a pawl within the camera is positioned for cooperation with the metering perforations in the film. When the pawl enters a metering perforation, a metering mechanism is actuated which causes arrestment of the camera film advancing mechanism. The pawl is withdrawn from the perforation and returned to its operative position in response to operation of the camera shutter. In many such cameras, subsequent actuation of the film advance mechanism performs several functions in addition to film advance. The film advance mechanism may move the shutter actuating mechanism to a cocked position for subsequent operation and in addition may move the pawl to an intermediate position in which it rests against the film in preparation for engagement with the next perforation. Should a discontinuity be present in the film and arrive at the metering position prior to cocking of the shutter operating mechanism, the pawl may function as though it has engaged a perforation and thereby trigger the film metering mechanism to prevent continued movement of the film. Such an occurrence will result in jamming of the camera since the film metering mechanism prevents actuation of the film advance mechanism and the pawl is removed from a film perforation only upon actuation of the shutter operating mechanism which has not yet been moved to its cocked position.

SUMMARY OF THE INVENTION

Accordingly, it is an object of the present invention to provide an improved mechanism for preventing film metering prior to shutter cocking.

It is a further object of the present invention to provide such a mechanism which is simple in construction.

It is still a further object of the present invention to provide such a mechanism which is inexpensive to manufacture.

These and other objects are accomplished according to the present invention by providing a film advance metering mechanism which comprises a metering lever having a metering pawl which is engagable with the film advancing mechanism and a sensing slide having a sensing pawl which is engagable with a metering perforation in the film. The sensing slide is coupled to the metering lever which is engaged by the camera high energy lever prior to movement of the high energy lever to its cocked position. Movement of the high energy lever to its cocked position disengages the high energy lever from the metering lever, thereby permitting movement of the sensing pawl into a perforation in the film and subsequent engagement of the metering pawl with the film advancing mechanism.

BRIEF DESCRIPTION OF THE DRAWINGS

In the detailed description of the preferred embodiment of the invention presented below, reference is made to the accompanying drawings in which:

FIG. 1 is a plan view of a camera incorporating the film metering mechanism of the present invention with portions thereof broken away to depict the internal camera mechanisms;

FIG. 2 is a view along the line 2—2 of FIG. 1;

FIG. 3 is a view along the line 3—3 of FIG. 1;

FIG. 4 is a view of the camera after operation of the shutter actuating mechanism;

FIG. 5 is a view along the line 5—5 of FIG. 4;

DESCRIPTION OF THE PREFERRED EMBODIMENT

Figure 6:
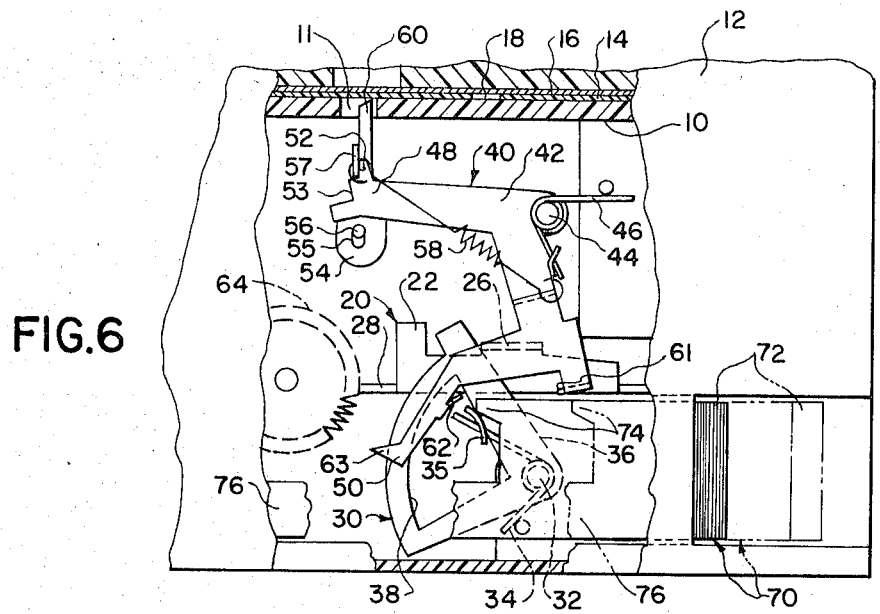
FIG. 6 is a view of the camera according to FIG. 1 at the end of the first stroke of the film advance mechanism of the camera.

Because photographic cameras are well known, the present description will be of the mechanisms associated with the present invention, with the understanding that structural elements not particularly described may be selected from those known in the art. Referring now to FIG. 1, a camera is shown which includes a camera frame 10 and a camera body 12 mounted on frame 10, with body 12 being broken away to reveal the inner mechanisms of the camera. The camera is of the type adapted to accept a roll film cartridge of the kind containing the film 14 and a backing paper 16 with metering perforations 18 in the film at predetermined intervals. Camera frame 10 includes a metering recess 11 over which perforations 18 pass as film 14 is advanced. The camera mechanisms include a body release mechanism shown generally as 20, a high energy lever shown generally as 30, a metering mechanism shown generally as 40 and a film advance slide 70.

Body release mechanism 20 comprises an elongated body release lever 22, mounted within the camera for movement about a pivot 24 which is fixed in the camera. Lever 22 includes an integrally formed latching lug 26 having a cam surface 27 and a flash actuating arm 28. The flash firing mechanism is not illustrated as it may be of any type which is actuatable by movement of the body release lever. Movement of lever 22 about pivot 24 to the position illustrated in phantom in FIG. 2 is caused by operator actuation of a button (not shown) which extends externally of camera body 12.

High energy lever 30 is mounted on a pin 32 fixed within the camera and is biased for movement in a clockwise direction by a spring 34 which engages a lug 35 on lever 30. Lever 30 includes a shutter actuating surface 36 and a cam surface 38.

Metering mechanism 40 includes a metering lever 42, mounted for movement about a fixed pin 44 and biased in a clockwise direction by a spring 46. Lever 42 includes an integrally formed sensing arm 48 and metering arm 50. Sensing arm 48 terminates in metering surfaces 52 and 53. Sensing slide 54 is mounted for reciprocal and pivotable movement by means of a fixed pin 56 extending within slot 55 in sensing slide 54. Sensing slide 54 includes a lug 57 and is biased by a spring 58 coupled to metering lever 42 so that lug 57 is urged into contact with metering surface 53 in the position illustrated in FIG. 1. During subsequent operation of the camera mechanisms, lug 57 will be urged into contact with surface 52, as will be explained in more detail hereinafter. Sensing slide 54 terminates in a sensing pawl 60 which is positionable for engagement with a perforation 18 in film 14 being advanced within the camera. Metering arm 50 includes an unlocking lug 61 and a blocking lug 62 and terminates in a metering pawl 63 which is positionable for engagement with a tooth on a ratchet wheel 64. Ratchet wheel 64 is rotatable in a counterclockwise direction with the film advance mechanism of the camera and prevents movement of that mechanism when metering pawl 63 engages a tooth on wheel 64. The film advance mechanism is not illustrated and may be of any conventional design for movement of a roll film within the camera. One example of such a mechanism, which is operable by a film advance slide 70, is disclosed in U.S. Pat. No. 3,712,200. Film advance slide 70 includes a tab portion 72 extending externally of camera body 12 for actuation by the camera operator. Slide 70 further includes an integrally formed cocking lug 74 which is movable into engagement with lug 35 on high energy lever 30 and a film advance arm 76 which is movable to actuate the film advance mechanism of the camera, in a manner similar to that disclosed in U.S. Pat. No. 3,712,200.

The early metering failure prevention device of the present invention is illustrated in FIG. 1 just prior to picture taking operation of the camera. As the operator depresses the externally accessible button, body release lever 22 will be pivoted to the position illustrated best in phantom in FIG. 2. In so moving, latching lug 26 is moved out of engagement with high energy lever 30, permitting high energy lever 30 to move in a clockwise direction under the bias of spring 34 to actuate the shutter by means of actuating surface 36. During such movement, lug 35 on high energy lever 30 will engage unlocking lug 61 on metering lever 42 and cause counterclockwise rotation of metering lever 42, thereby removing metering pawl 63 from engagement with ratchet wheel 64. Movement of metering lever 42 also causes withdrawal of sensing pawl 60 from perforation 18 of film 14, since sensing slide 54 is interconnecting with metering lever 42 by means of spring 58. Sensing slide 54 moves until pin 56 engages the end of slot 55. Continued movement of metering lever 42 then causes lug 57 to be moved out of contact with surface 53 and into contact with surface 52, with a consequent pivoting of sensing slide 54 about pin 56. The resulting position is illustrated in FIG. 4 with sensing pawl 60 withdrawn from the film perforation and pivoted to an intermediate position in which it is held out of contact with film 14, metering pawl 63 withdrawn from ratchet wheel 64 and high energy lever 30 in its uncocked position. Release of the externally accessible button by the operator will cause high energy lever 30 to be tilted as illustrated in FIG. 5 by engagement with cam surface 27 on body release lever 22. Such movement of high energy lever 30 brings cam surface 38 into a position where it is engagable by blocking lug 62 on metering lever 42 for reasons which will become more clear hereinafter.

The camera may now be prepared for subsequent picture taking operation by operator actuation of tab portion 72 which extends externally of the camera. Movement of tab portion 72 to the left from the position illustrated in FIGS. 1 and 4 to the position illustrated in FIG. 6 moves the camera mechanisms toward the positions illustrated in FIG. 6. As film 14 is advanced, perforation 18 is moved away from the metering position and is clear of that position when tab 72 has been moved approximately one third of its full travel, as illustrated in phantom in FIG. 6. Continued movement of tab 72 brings cocking lug 74 into engagement with lug 35 on high energy lever 30 and continued movement of tab 72 causes rotation of high energy lever 30 about pin 32. Metering lever 42 moves with lever 30, under the bias of spring 46, with unlocking lug 61 in contact with lug 35 and sensing slide 54 moves with metering lever 42 until sensing pawl 60 is brought into contact with film 14. At a point when tab 72 has been moved through approximately two thirds of its full travel, lug 35 is disengaged from lug 61. Metering lever 42 would then be free to move under the bias of spring 46 to a locking position. However, such movement will be prevented by engagement of blocking lug 62 on metering lever 42 with cam surface 38 on high energy lever 30 due to the tilting of high energy lever 30 caused by engagement with cam surface 27 on body release lever 22. Just prior to movement of tab portion 72 to its full travel position, high energy lever 30 reaches the end of cam surface 27 and is engaged by latching lug 26 of body release lever 22. As high energy lever 30 falls behind latching lug 26, it moves to the position illustrated in FIG. 3 in which it is no longer tilted. Such movement disengages blocking lug 62 on metering lever 42 from engagement with cam surface 38, thereby freeing metering lever 42 to move under the bias of spring 46 in a clockwise direction. However, movement of metering lever 42 is prevented by sensing slide 54 since sensing pawl 60 is contacting the surface of film 14. Thus, it may be seen that metering is prevented by interaction of metering lever 42 with high energy lever 30 until high energy lever 30 has reached its cocked position. Metering has still not been accomplished, because perforation 18 in film 14 has not reached its metering position, as will now be described.

Figure 7:
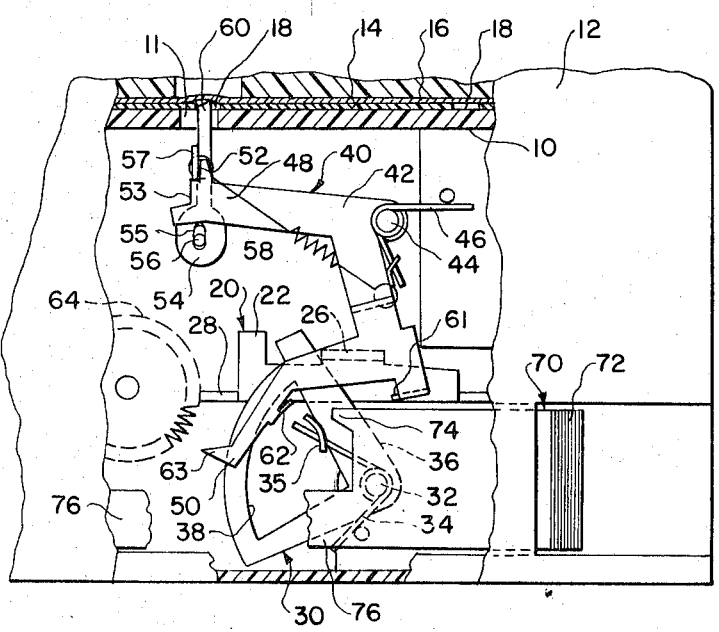
FIG. 7 is a view of a camera according to FIG. 1 just prior to completion of the second stroke of the film advance mechanism.

Although metering lever 42 has been freed for movement to its metering position by disengagement of lug 62 from cam surface 38, such movement is still prevented because sensing pawl 60 on sensing slide 54 is resting upon the film as illustrated in FIG. 6 and lug 57 engages metering surface 52 on lever 42. Metering will not be accomplished until a subsequent perforation 18 reaches the metering position as is illustrated in FIG. 7. When perforation 18 arrives at the metering position, sensing pawl 60 moves into engagement with perforation 18 thereby causing movement of sensing slide 54 to its extended position because of the urging of metering lever 42 on lug 57 through surface 52 under the bias of spring 46. This extended position is illustrated in FIG. 7, in which perforation 18 has just been engaged by sensing pawl 60 but metering has not been achieved because metering pawl 63 has not yet moved into engagement with a tooth on ratchet wheel 64. Such movement occurs when the trailing end of perforation 18 engages sensing pawl 60 and causes pivoting of sensing slide 54 about fixed pin 56. Pivoting of sensing slide 54 disengages lug 57 from surface 52 of metering lever 42 and moves lug 57 into contact with surface 53, as illustrated in FIG. 1. Movement of lug 57 out of engagement with surface 52 permits metering lever 42 to move to the position illustrated in FIG. 1, in which metering pawl 63 engages a tooth on ratchet wheel 64 and thereby prevents rotation of ratchet wheel 64 and the associated film advance mechanism. Thus it may be seen that two conditions must be satisfied for metering of the film. First, high energy lever 30 must be returned to its cocked position, thereby freeing blocking lug 62 from engagement with cam surface 38 and second, a perforation 18 must have moved sensing slide 54 to a predetermined metering position in which sensing slide 54 permits clockwise movement of metering lever 42 to bring metering pawl 63 into engagement with ratchet wheel 64.

The invention has been described in detail with particular reference to a preferred embodiment thereof, but it will be understood that variations and modifications can be effected within the spirit and scope of the invention.

I claim:

1. A camera having a shutter and adapted for receiving a film having metering discontinuities spaced at predetermined intervals therealong, said camera comprising:
   means for advancing a received film, said advancing means having an active condition wherein said advancing means is movable for advancing film and an inactive condition wherein said advancing means is locked against movement for advancing film;
   means for metering a received film in predetermined increments by preventing further advancement of the film, said metering means comprising:
   sensing means for engaging a metering discontinuity in a received film, said sensing means being movable to a metering position subsequent to engaging a metering discontinuity; and
   means coupling said sensing means and said advancing means for placing said advancing means in said inactive condition in response to movement of said sensing means to said metering position;
   means, including a member releasable from a cocked position, for actuating the shutter and for placing said advancing means in said active condition; and means interconnecting said metering means and said shutter actuating means for preventing said sensing means from engaging a film discontinuity when said releasable member is not in its cocked position.

2. A camera as in claim 1, wherein said interconnecting means includes a cam surface engagable with said metering means to prevent said sensing means from engaging a film discontinuity.

3. A camera as in claim 2, wherein said cam surface is on said releasable member.

4. A camera as in claim 1, wherein said interconnecting means includes a blocking lug engagable by said releasable member when said member is not in its cocked position to prevent said sensing means from engaging a film discontinuity.

5. A camera as in claim 4, wherein said metering means includes said blocking lug.

6. A camera having a shutter and adapted for receiving and exposing a film having metering discontinuities at predetermined intervals therealong, said camera comprising:
   means for actuating the shutter, said actuating means including a member releasable for movement from a cocked position and having a cam surface thereon;
   means for advancing a received film, said advancing means having an active condition wherein said advancing means is movable for advancing film and having an inactive condition wherein said advancing means is prevented from moving to advance film;
   means, including a sensing member, for metering a received film subsequent to said sensing member engaging a metering discontinuity in the film, said metering means having a sensing condition wherein said sensing member is engageable with a metering discontinuity, a metering condition wherein said sensing member is engaged with a metering discontinuity and said sensing member is in a metering position and an inactive condition wherein said sensing member is not engaged with nor engageable with a metering discontinuity; and
   means coupling said shutter actuating means, said advancing means and said metering means for moving said releasable member to its cocked position, for placing said metering means in said inactive condition and said advancing means in said active condition in response to release of said releasable member from its cocked position, for placing said metering means in said sensing condition in response to initial movement of said film advancing means in said active condition, for placing said metering means in said metering condition upon continued movement of said film advancing means and for placing said advancing means in said inactive condition in response to placing of said metering means in said metering condition, wherein said coupling means includes a lug engageable by said cam surface when said releasable member is not in its cocked position for preventing said sensing member from engaging a film discontinuity during movement of said advancing means until said releasable member has been moved to its cocked position.

7. A camera having a shutter movable between a rest position and an exposure position and adapted for receiving and exposing a film having metering discontinuities at predetermined intervals therealong, said camera comprising:
   a high energy lever releasable for movement from a cocked position to effect movement of the shutter to its exposure position, said high energy lever having a cam surface thereon;
   means for advancing a received film;

a sensing member movable from an inactive position to a metering position upon engagement with a metering discontinuity in a received film;

a metering member, including a lug formed thereon, said metering member being movable to an active position in engagement with said advancing means to prevent film advancement in response to movement of said sensing member to said metering position, said metering member being movable to an inactive position in response to movement of said high energy lever from said cocked position and said lug being positioned for engagement by said cam surface during return of said high energy lever to said cocked position; and means interconnecting said sensing member and said metering member to prevent movement of said sensing member to said metering position when said lug is engaged by said cam surface.

* * * * *